United States Patent
Nagata et al.

(10) Patent No.: US 6,820,806 B2
(45) Date of Patent: Nov. 23, 2004

(54) MANUAL CARD READER

(75) Inventors: Shigeyuki Nagata, Nagano (JP); Kenji Hirasawa, Nagano (JP); Kazunori Takahashi, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 10/446,566

(22) Filed: May 28, 2003

(65) Prior Publication Data

US 2004/0079805 A1 Apr. 29, 2004

(30) Foreign Application Priority Data

May 28, 2002 (JP) ........................................ 2002-153736
Dec. 5, 2002 (JP) ........................................ 2002-354299

(51) Int. Cl.[7] ................................................. G06K 7/00
(52) U.S. Cl. ..................... 235/439; 235/482; 235/483; 235/485; 235/486; 235/492; 235/493; 235/380
(58) Field of Search .................................. 235/482, 483, 235/485, 486, 492, 493, 380, 439, 479, 484, 379, 441

(56) References Cited

U.S. PATENT DOCUMENTS

| | | | | |
|---|---|---|---|---|
| 4,581,523 A | * | 4/1986 | Okuno | ...................... 235/479 |
| 5,010,239 A | * | 4/1991 | Mita | ........................... 235/441 |
| 5,196,687 A | * | 3/1993 | Sugino et al. | ............... 235/483 |
| 6,162,122 A | * | 12/2000 | Acres et al. | ................... 463/29 |
| 6,186,401 B1 | * | 2/2001 | Magana | ...................... 235/475 |
| 6,494,364 B2 | * | 12/2002 | Shepherd | ..................... 235/379 |
| 6,616,050 B1 | * | 9/2003 | Oki et al. | .................... 235/479 |
| 2002/0088862 A1 | * | 7/2002 | Imai et al. | ................... 235/475 |

FOREIGN PATENT DOCUMENTS

| | | | |
|---|---|---|---|
| JP | 0363992 | * | 10/1989 |
| JP | 2000-259778 | | 9/2000 |
| JP | 2000-322521 | | 11/2000 |
| JP | 2000-322522 | | 11/2000 |

* cited by examiner

Primary Examiner—Karl D. Frech
Assistant Examiner—Daniel Walsh
(74) Attorney, Agent, or Firm—Reed Smith LLP

(57) ABSTRACT

A manual card reader comprises a slot frame with a recess provided in the slot frame in the card insertion direction to allow insertion or removal of a card. A card is inserted into the slot to a holding point through the recess and is taken out therefrom. The manual reader further comprises a shutter that prevents insertion of a foreign object beyond the recess into the card reader. A first locking device is detachably provided at one end of the shutter. A second locking device is detachably provided at the other end of the shutter.

5 Claims, 5 Drawing Sheets

MANUAL CARD READER

CROSS REFERENCE TO RELATED APPLICATIONS

This application claims priority of Japanese Application No. 2002-153736, filed on May 28, 2002 and Japanese Application No. 2002-354299, filed Dec. 5, 2002, the complete disclosures of which are hereby incorporated by reference.

BACKGROUND OF THE INVENTION a) Field of the Invention

The present invention relates to a manual card reader that reads and writes data on a magnetic card, an IC card or a similar kind of card. More specifically, it relates to a shutter mechanism and a card guiding mechanism of the manual card reader.

b) Description of the Related Art

In the market for card readers, there is growing demand for preventive measures for fraudulent use by insertion of a foreign object or wire material other than a coin or a card made of paper or similar material for both manual or motor drive type card readers.

Motor drive type card readers have an entire surface, i.e., full length, shutter on a slot, a driving source of a solenoid type for opening the entire surface, i.e., full length shutter, and a prehead that reads data on a card to be inserted before it is inserted. When a card is inserted, the prehead determines whether a card to be inserted is a correct card or not, and only when the card is correct, the solenoid is actuated to open the shutter. Otherwise, the entire surface, i.e., full length, shutter is closed, thereby preventing insertion of a foreign object therein.

Another type of manual card reader has a horizontal discharge slot 101 and vertical discharge slot 102 as illustrated in FIG. 6. In this configuration, a coin 100 or foreign object of other kind is discharged from horizontal discharge slot 101 only when manual card reader 103 is horizontally installed while coin 100 or a foreign object of other kind is discharged from vertical discharge slot 102 only when manual card reader 103 is vertically installed. Another type of manual card reader has a shutter and a plunger such that insertion or pulling of a card rotates the shutter. Another type of manual card reader has a solenoid (actuated) plunger that is capable of locking the shutter. In this type, there is no card inserted in the card reader, the plunger is closed to lock the shutter; when insertion of a card is detected, the plunger unlocks the shutter. The shutter is thus closed and locked, thereby preventing insertion of a foreign object.

As illustrated in FIG. 7, a manual card reader of this type has one slot-frame 201 recess 202, which has a recess 202 provided in the card insertion direction (see arrow in FIG. 7) to allow insertion or removal of a card. The card is removed from slot 200 to the holding point through recess 202 and then pulled out therefrom.

To further improve the ability of magnetic head 203 to read data of a magnetic strip on a card, a pressing lever 205, that presses the card onto card reference surface 204, may be provided on the opposite end of card reference surface 204. Pressing spring 206 pushes pressing lever 205 toward card reference surface 204 on the card. One end of the card is guided by card reference surface 204 only; the other end is guided by pressing lever 205 only.

Nonetheless, in a motor drive type card reader, a shutter mechanism accompanies a solenoid that requires a large space for the mechanism and further requires higher manufacturing costs. This is practically unacceptable for a manual card reader in view of the size and manufacturing costs.

The aforementioned manual card reader 103 having discharge port 101 and 102 discharges an inserted foreign object only by means of dropping. It cannot prevent fraudulent manipulation of the internality of manual card reader 103 by inserting into the slot a wire-like foreign object for example.

Additionally, in the manual card reader having a plunger that is capable of locking a shutter, it is often the case that the joint between the solenoid body and the plunger becomes loose momentarily, adversely affecting accurate locking of the shutter. In addition, one locking point requires one solenoid. For a minimum manufacturing cost that allows the use of only one solenoid, only one point per one shutter can be locked, thereby providing poor locking thereof. To enhance the strength of locking, more than one point on a shutter must be locked, which subsequently increases manufacturing costs. The additional locking further increases consumption of power by the entire equipment due to the additional power consumed by additional solenoids.

Problems Addressed by the Invention

Further, in the above manual card reader where only one end of a card is guided by movable lever 205, it is difficult to direct the card in the horizontal direction at the point of insertion, possibly causing error. For this reason, magnetic head 203 must read the data (on a magnetic strip) on the card at the point of pulling out of the card, not the point of insertion of the card.

The object of the present invention is to provide a manual card reader having a shutter that provides good locking that requires little space (i.e., no additional space for additional solenoids) and consumes no additional power.

Another object of the present invention is to further provide enhanced reading capability of data on a magnetic strip on a card at the time of insertion.

SUMMARY OF THE INVENTION

To overcome the above problems, the manual card reader of the invention comprises a slot-frame which has a recess provided in the card insertion direction to allow insertion or removal of a card. A card is inserted into the slot to a holding point through the recess and taken out therefrom. The manual card reader comprises: a shutter that prevents insertion of a foreign object through the bay into the card reader; a first locking means which is detachably provided at one end of the shutter; and a second locking means which is detachably provided at the other end of the shutter.

In short, the shutter prevents the card reader from insertion of a foreign object from outside of the machine; the two locking means provide stronger locking. Further, the two locking means are provided at both ends of the shutter. One cannot, therefore, unlock the shutter unless an operator uses a card or similar object.

The manual card reader further has a first pressing means that presses the shutter in the direction in which the first locking means locks and a second pressing means that presses the shutter in the direction in which the second locking means locks. The pressing force of the first pressing means is greater than that of the second pressing means.

As a result, when the card is inserted between the two locking means, the first pressing means presses the card against the second locking means. This helps in pushing the card against the first pressing means end as the card reference surface all the time.

The manual card reader still further includes a sensor for detecting the card outside the shutter, wherein the first locking means unlocks before the inserted card reaches the sensor and the second locking means unlocks immediately before the card that has passed the sensor reaches the shutter.

The first locking means is actuated before the card goes through the sensor, which enhances the ability of the sensor to read data on the magnetic strip. Moreover, the second locking means is actuated immediately before the card reaches the shutter, which prevents insertion of a foreign object very well.

The manual card reader yet additionally comprises that either said first locking means or said second locking means has a sensor for detecting the locking motion thereof. As a result, a single locking means equipped with a sensor detects insertion of a card and further locks the shutter. The number of components required for assembly can be minimized.

The manual card reader solves the problems of the prior art by providing a manual card reader having on a slot-frame, a recess provided in the insertion direction to allow insertion or removal of a card. A card is inserted into the slot to a holding point through the recess and taken out therefrom. The manual card reader is wherein: guides provided at both ends of the frame for guiding the card at the time of insertion; a sensor arranged on the recess toward the card's pull out direction; and a pressing means arranged opposite to the sensor on the frame so as to press the card onto the guide on the sensor end. The edge of the pressing member toward the card's pull out direction is more toward the card's insertion end than the card insertion slot.

At the time of insertion, the guide on the frame thus guides the card at both sides, which makes directing the card more accurate and easier than a guide of conventional technology, which guides the card with a movable member at the time of insertion.

The manual card reader as described above is characterized by the other end of the pressing member being arranged between the slot and the sensor. The card is detected after the inserted card contacts the pressing member, therefore, the speed of linear motion of the card at the time of detection in the middle of insertion of the card can thus become constant.

DESCRIPTION OF THE PREFERRED EMBODIMENTS

Figure 1:
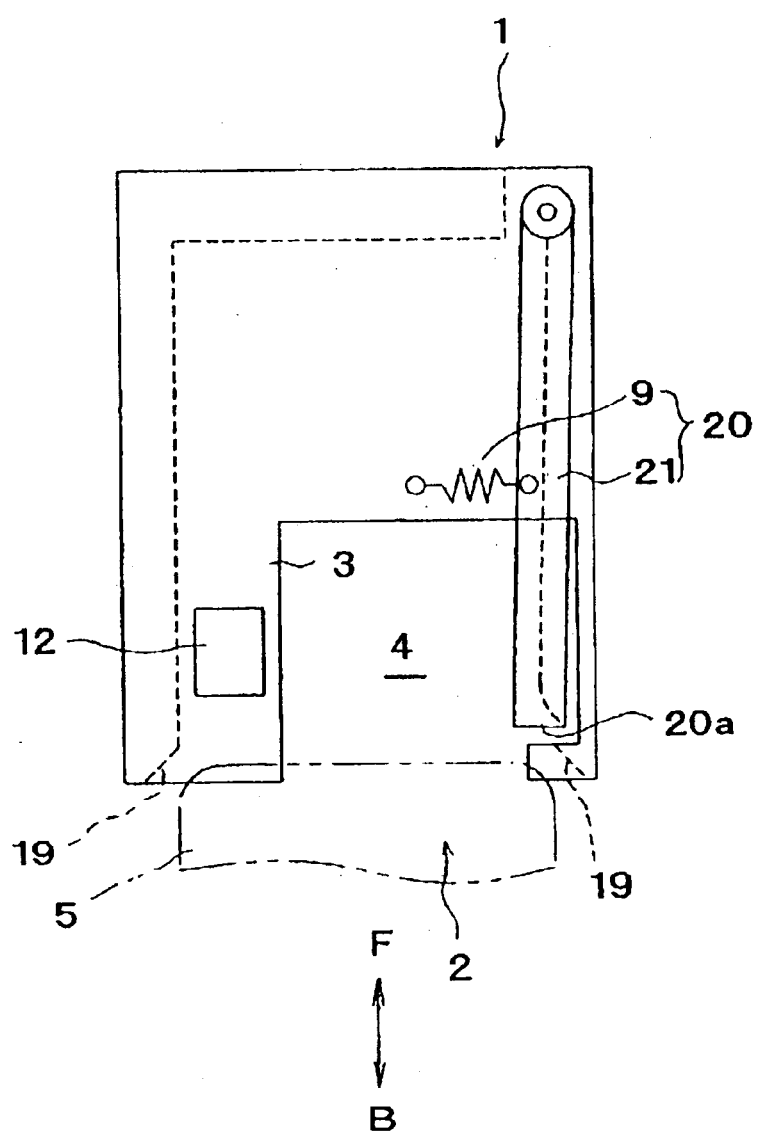
FIG. 1 is a top view illustrating a schematic of the manual card reader of the present invention in which a card is being inserted.
Figure 2:
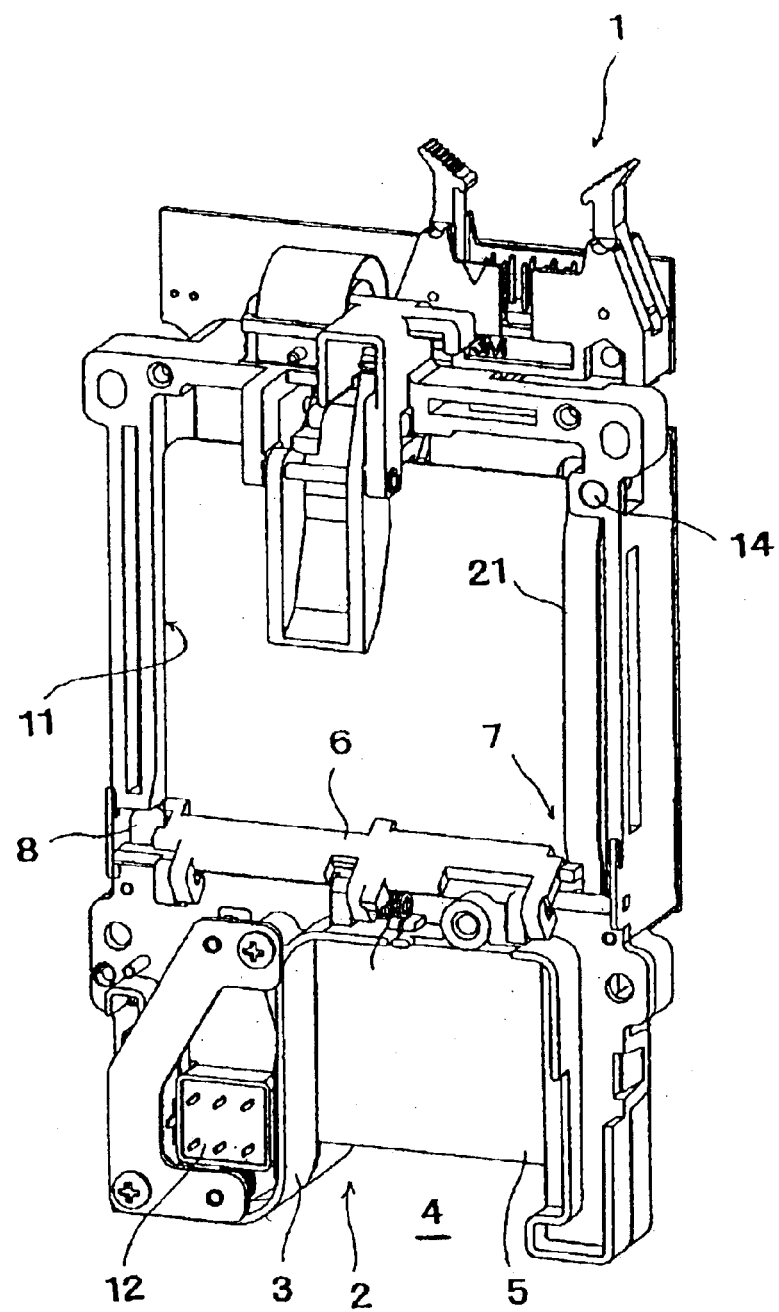
FIG. 2 is a perspective view illustrating the manual card reader in which a card is inserted.
Figure 3:
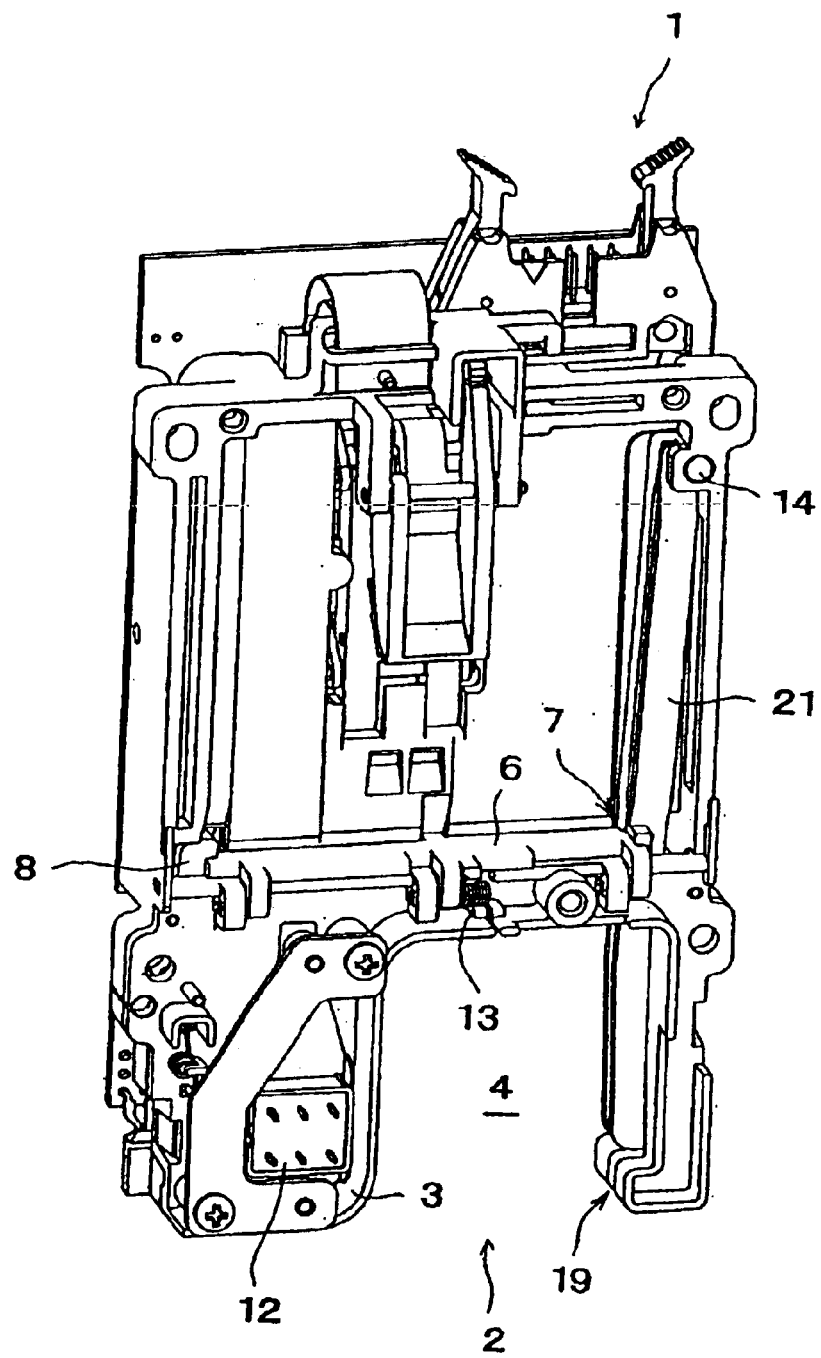
FIG. 3 is a perspective view illustrating the manual card reader from which a card is taken out.

FIGS. 1–5 illustrate an embodiment of the manual card reader 1 according to the present invention. Manual card reader 1 comprises: a slot 2 on frame 3, which has recess 4 provided in the card insertion direction F to allow insertion and removal of card 5 in such a manner that card 5 is inserted into slot 2 to a holding point through recess 4 to be taken out therefrom. Manual card reader 1 further comprises: guides provided on both ends of frame 3 for guiding card 5 at the time of insertion; sensor 12 provided at the B end on recess 4 for detecting card 5 from which card 5 is pulled out; and pressing member 20 arranged at the other end of guide 19 (opposite to the sensor 12 end) on recess 4 to push card 5 to guide 19 toward 12. Further, the end 20a of pressing member 20 provided in the card's pull out direction end is more toward the card insertion direction F than slot 2. At the time of insertion, guide 19 guides card 5 at both ends, thus easing and appropriating the insertion direction of card 5.

Figure 4:
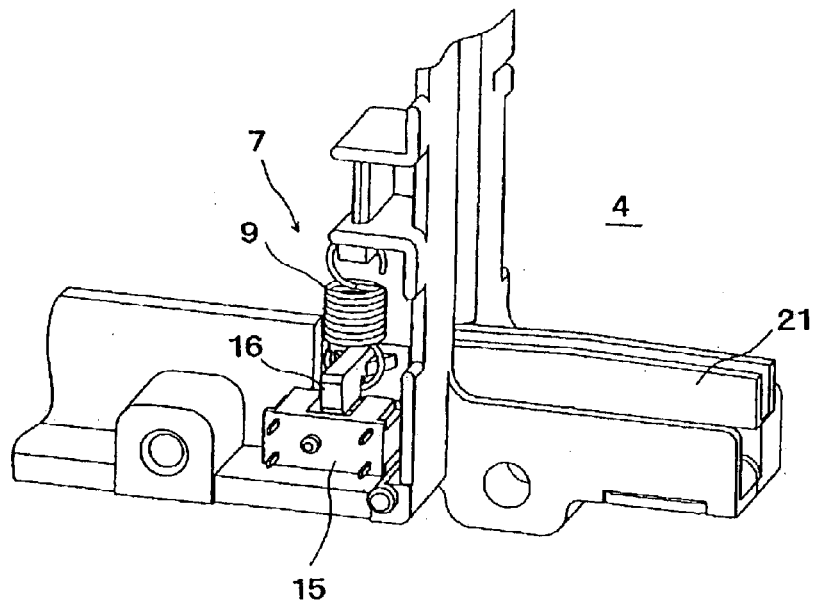
FIG. 4 is a perspective view illustrating the vicinity of the first locking means.
Figure 5:
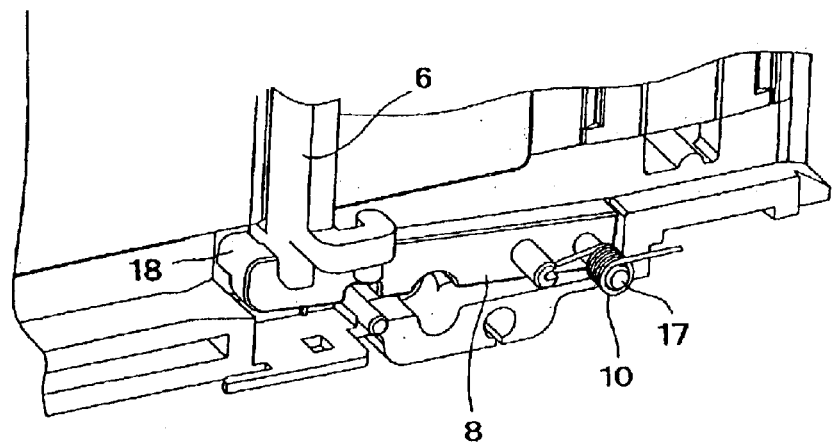
FIG. 5 is a perspective view illustrating the vicinity of the second locking means.
Figure 6:
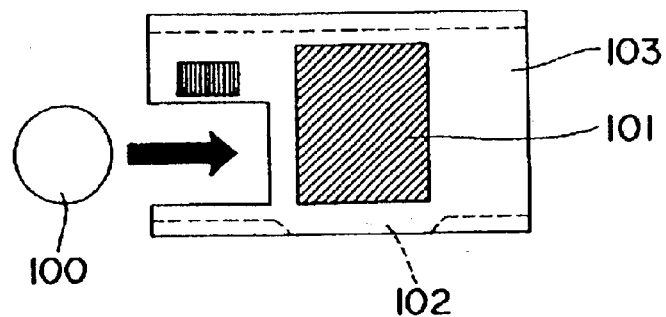
FIG. 6 is a top view illustrating a conventional shutter mechanism of a card reader.
Figure 7:
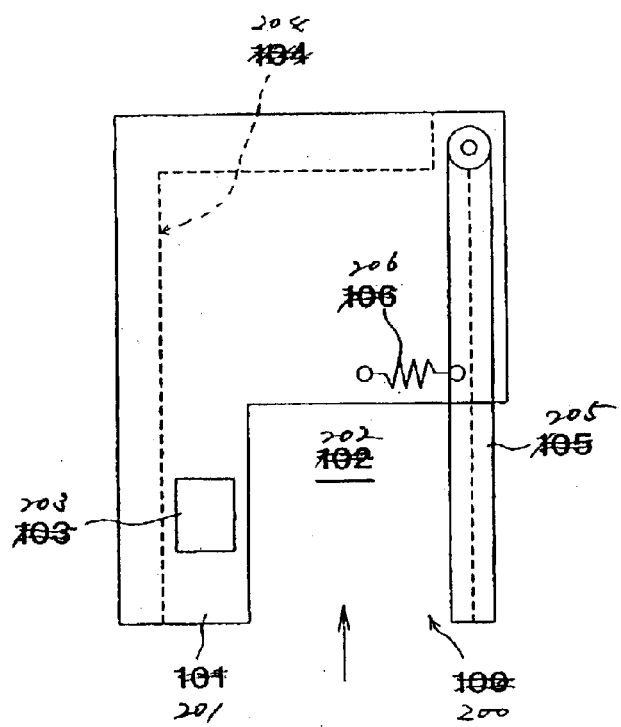
FIG. 7 is a top view illustrating a conventional card guiding mechanism of a card reader.

Pressing member 20 comprises: lever 21 rotatably supported by supporting shaft 14 near the card insertion completion point; and a first pressing means 9 that presses lever 21 toward card 5. First pressing means 9 is made of an extension spring as illustrated in FIG. 4.

The end of pressing member 20 toward the card's pull out direction is located between card insertion slot 2 and sensor 12. Sensor 12 thus detects card 5 when card 5 is inserted and touches pressing member 20. The linear speed of card 5 at the time of detection by sensor 12 thus becomes constant.

Manual card reader 1 further comprises: a shutter 6 that interrupts insertion of a foreign object beyond recess 4; a first locking means 7 detachably provided at one end of shutter 6; and a second locking means 8 detachably provided at the other end of shutter 6. Shutter 6 prevents insertion of a foreign object from outside the machine. The two locking means 7 and 8 enhance the locking strength. The two locking means 7 and 8 are provided at both ends of shutter 6, providing a mechanism that cannot be unlocked unless an operator uses (inserts) a card or similar object thereto, thereby enhancing security of card reader 1.

First locking means 7 is provided on lever 21 of pressing means 20. Manual card reader 1 comprises: first pressing means 9 which contacts shutter 6 to press first locking means 7 in the locking direction; and second pressing means 10 which also presses second shutter 6 to press second locking means 7 in the locking direction. This locking mechanism is configured such that the pressing force of the first pressing means is greater than that of second pressing means. As a result, when card 5 is inserted between the two locking means 7 and 8, first pressing means 9 presses card 5 toward second locking means 8. Utilizing the second locking means 8 end as card reference surface 11 allows card 5 being pushed toward card reference surface 11 all the time.

Sensor 12 is a head comprising a magnetic head arranged outside shutter 6. First locking means 7 unlocks before the inserted card 5 reaches sensor 12; second locking means 8 unlocks immediately before card 5 that has passed sensor 12 reaches shutter 6. The mechanism that first locking means 7 having a larger re-bounce is actuated before card 5 passes sensor 12 enhances the ability of sensor 12 to read data on a magnetic strip. The mechanism that second locking means 8 is actuated immediately before card 5 reaches shutter 6 prevents insertion of a foreign object very well.

Shutter 6 is the entire surface (i.e., full length) type that completely closes the entire card transfer path. Shutter 6 is integrally formed with rotary bearing shaft that is engaged with the bearing on the body of frame 3. The number of components required for the shutter assembly is thus minimized. Rotary bearing shaft has shutter unwinding spring 13 made of a torsion coil spring. Each arm of this shutter unwinding spring 13 is hooked with shutter 6 and the body of frame 3. Shutter 6 is normally pressed and therefore closed.

Herein, the longitudinal lengths of shutter 6 and the spring housing in the body of frame 3 are somewhat longer than the length of shutter unwinding spring 13. A pressing force is applied to shutter 6 at the opposing end of the spring housing along the longitudinal direction. Falling off of shutter 6 from the body of frame 3 is thus prevented. Shutter unwinding spring 13 provides a position holding function to shutter 6.

First locking means 7 has sensor 15 for detecting the motion of first locking means 7 as illustrated in FIG. 4. First locking means 7 having sensor 15 can, therefore, detect insertion of card 5, thereby providing first locking means 7 a dual function, a shutter locking member and a card insertion detection member. The number of components required (for manufacturing the shutter assembly) can thus be minimized. First locking means 7 has sensor 15 which can detect a card without a magnetic strip for sensor 12, which cannot detect insertion of card 5 without a magnetic strip. In this embodiment, sensor 15 is a photo-interrupter and first locking means 7 has shield 16 that turns on or off sensor 15. Insertion of card 5 rotates first locking means 7 to turn on or off sensor 15. Whether card 5 is inserted or not is thus detected.

Second locking means 8 is rotatably supported by center shaft 17, which is the front end of shutter 6. Second pressing means 10 is made of torsion coil spring. Hook 18 on second locking means 8 to be engaged with shutter 6 is provided at a point above or off the card transfer surface in the card thickness direction. This prevents hook 18 from interrupting transfer motion of card 5.

The operation of the aforementioned manual card reader 1 is described herein.

When an operator inserts card 5, shutter 6 is closed and pressing means 9 and 10 press locking means 7 and 8 to lock shutter 6. In this state, pushing shutter 6 with a coin, wire or a foreign object of other kinds does not open shutter 6.

When an operator inserts card 5 into slot 2, card 5 is guided therein with the assistance of frame 3 without slanting horizontally. Card 5 further pushes open lever 21 of pressing member 20. Pressing means 9 of pressing member 20 subsequently pushes card 5 toward card reference surface 11, thereby enhancing the ability of sensor 12 to accurately read data on a magnetic strip on card 5.

Upon insertion of card 5 through recess 4, card 5 pushes first locking means 7 to rotate until shutter 6 is unlocked. As an operator further inserts card 5, card 5 pushes second locking means to rotate until shutter 6 is unlocked. At this time, shutter 6 is completely unlocked, thereby opening shutter 6. As card 5 reaches shutter 6, card 5 opens shutter 6.

In contrast, when an operator pulls out the inserted card 5 and takes card 5 out of shutter 6, shutter 6 closes due to shutter unwinding spring 13. As the operator pulls out card 5, pressure from card 5 against second locking means 8 is released and second pressing means 10 presses second locking means 8 to lock shutter 6. Further, when the operator further pulls out card 5, pressure from card 5 against first locking means 7 is released and first pressing means 9 presses first locking means 7 to lock shutter 6.

The embodiment described above is a preferred embodiment; however, the present invention is so limited. The present invention, therefore, can be modified in many different ways as long as its spirit remains the same. For example, sensor 15 is provided on locking means 7 in the embodiment, however, it may be provided on second locking means 8. Further, sensor 15 is a photo-interrupter but may be a micro-switch or of the kind.

In the embodiment, the shutter 6 closes the entire card transfer path, however, it may also shut only a part of the card transfer path.

Moreover, in the embodiment, pressing member 20 has lever 21 and pressing means 9, however, it may have a single flat spring.

Further in the embodiment, a shutter mechanism that is linked to pressing member 20 is provided. The shutter mechanism, however, may be eliminated.

ADVANTAGEOUS EFFECTS OF THE INVENTION

As described above, the manual card reader in a form of the invention has a shutter. Insertion of a foreign object from outside the machine is thus prevented. The presence of two locking means further enhances the locking force.

A physical push from a card actuates both a shutter and each of the locking means. The need for a separate driving source is thus eliminated. An increase in manufacturing costs and a demand for a large space for a large sized card reader that additional driving sources would require is also eliminated, thereby preventing an increase in power consumption.

Since locking means are arranged at both ends of a shutter, insertion of a card having an irregular width would not actuate the locking means. This prevents fraudulent insertion of a foreign object or fraudulent manipulation of the card reader. Even though there remains a possibility that a card having a regular width may unlock the shutter to enter the internality of the card reader, such insertion of a foreign object of that shape (i.e., width) does not damage the card reader. In other words, insertion of a foreign object that may damage the card reader is prevented.

In a form of the manual card reader described above, when a card is inserted between the two locking means, the first pressing means pushes the card toward the second locking means end. The card is thus pushed against the reference surface, which is the second locking means. The reliability of the head in accurately reading data from a magnetic strip on a card is thus enhanced.

The manual card reader according to another variation actuates the first locking means having a larger rewinding capability before card 5 passes the sensor that detects card. The sensor further increases the reliability of the head in accurately reading data from a magnetic strip on the card. Further, the manual card reader also actuates the second locking means immediately before the card reaches the shutter. Fraudulent insertion of a foreign object or fraudulent use of the manual card reader is thus prevented, subsequently enhancing the security characteristic of the manual card reader.

In the manual card reader according to yet another variation, the first locking means or the second locking means has a sensor for detecting locking motion thereof. As a result, a single locking means equipped with a sensor detects insertion of a card and locks the shutter. The number of components required for assembly can be minimized.

As described above, in the manual card reader at the time of insertion, guides made by both ends of a frame guide, the card along both sides. Compared to the guiding mechanism of conventional technology in which a movable member guides the card at the time of insertion, the guiding mechanism of the present invention can direct the card more easily and accurately utilizing the guides at both ends of the frame. In other words, the mechanism of the present invention minimizes horizontal slanting of a card at the time of insertion.

In the manual card reader above, a card is detected after the inserted card contacts the pressing member. As a result, the speed of linear motion of the card becomes constant. In other words, the velocity of card insertion does not vary when the card touches the pressing member. The card insertion speed will not fluctuate during reading of data on the card, thereby enhancing accurate reading of data on the magnetic strip on the card.

While the foregoing description and drawings represent the present invention, it will be obvious to those skilled in the art that various changes may be made therein without departing from the true spirit and scope of the present invention.

What is claimed is:

1. A manual card reader comprising:
    a slot-frame, a recess provided in said slot frame in the card insertion direction to allow insertion or removal of a card, said card inserted into said slot to a holding point through said recess and taken out therefrom;
    said manual card reader further comprising:
    a shutter that prevents insertion of a foreign object beyond said recess into said card reader;
    a first locking means which is detachably provided at one end of said shutter; and
    a second locking means which is detachably provided at the other end of said shutter;
    wherein said first locking means has a first pressing means that presses said shutter in the direction said first locking means locks and said second locking means has a second pressing means that presses said shutter in a locking direction, wherein the pressing force of said first pressing means is greater than that of said second pressing means.

2. The manual card reader according to claim 1 wherein the manual card reader has a sensor for detecting said card outside said shutter; wherein said first locking means unlocks before said inserted card reaches said sensor and said second locking means unlocks immediately before said card that has passed said sensor reaches said shutter.

3. The manual card reader according to claim 1 wherein either said first locking means or said second locking means has a sensor for detecting locking motion thereof.

4. A manual card reader comprising:
    a slot-frame;
    said slot frame having a slot thereon which has a recess provided in the insertion direction to allow insertion or removal of a card, said card being inserted from the slot to a holding point through said slot and taken out therefrom;
    said manual card reader further comprising:
    guides provided at both ends of said frame for guiding said card at the time of insertion;
    a sensor arranged on said frame toward a card's pull out direction; and
    a pressing member arranged opposite to said sensor on said frame for pressing said card onto said guide on said sensor end;
    wherein the end of said pressing member is arranged between the entrance of said slot and said sensor.

5. A manual card reader comprising:
    a slot-frame having an insertion slot which has a recess provided in an insertion direction to allow insertion or removal of a card;
    guides provided at both ends of said frame for guiding said card at the time of insertion;
    a sensor arranged on said frame toward said card's pull out direction; and
    a pressing member arranged opposite to said sensor on said frame for pressing said card onto said guide on said sensor end;
    wherein the end of said pressing member toward said card's pull out direction is arranged between the entrance of said insertion slot and said sensor so that said card is detected after said card contacts said pressing member.

* * * * *